(12) United States Patent
Joo

(10) Patent No.: US 12,375,498 B2
(45) Date of Patent: Jul. 29, 2025

(54) DAG-AWTC LEDGER SYSTEM USING BFT VERIFICATION CONSENSUS MECHANISM

(71) Applicant: BLOOM TECHNOLOGY, INC., Seongnam-si (KR)

(72) Inventor: Young Hyun Joo, Yongin-si (KR)

(73) Assignee: BLOOM TECHNOLOGY, INC., Seongnam-si (KR)

( * ) Notice: Subject to any disclaimer, the term of this patent is extended or adjusted under 35 U.S.C. 154(b) by 560 days.

(21) Appl. No.: 17/627,820

(22) PCT Filed: Jul. 21, 2020

(86) PCT No.: PCT/KR2020/009586
§ 371 (c)(1),
(2) Date: Jun. 22, 2022

(87) PCT Pub. No.: WO2021/020792
PCT Pub. Date: Feb. 4, 2021

(65) Prior Publication Data
US 2022/0321575 A1 Oct. 6, 2022

(30) Foreign Application Priority Data
Aug. 1, 2019 (KR) .......... 10-2019-0093679

(51) Int. Cl.
*H04L 9/40* (2022.01)
*G06F 11/14* (2006.01)
(Continued)

(52) U.S. Cl.
CPC .............. *H04L 63/12* (2013.01); *G06F 11/14* (2013.01); *G06F 16/9024* (2019.01); *H04L 67/104* (2013.01)

(58) Field of Classification Search
CPC ......... H04L 63/12; H04L 9/50; H04L 9/3236; H04L 63/0428; G06F 16/9024
See application file for complete search history.

(56) References Cited

U.S. PATENT DOCUMENTS

2019/0278666 A1 9/2019 Lin
2019/0354518 A1* 11/2019 Zochowski ......... G06F 16/2379
(Continued)

FOREIGN PATENT DOCUMENTS

CN 109961364 A * 7/2019 ........... G06Q 20/382
KR 10-1827373 B1 2/2018
(Continued)

OTHER PUBLICATIONS

International Search Report for PCT/KR2020/009586 mailed Oct. 15, 2020 from Korean Intellectual Property Office.
(Continued)

*Primary Examiner* — Ali S Abyaneh
(74) *Attorney, Agent, or Firm* — Revolution IP, PLLC

(57) ABSTRACT

A directed acyclic graph account-wise transaction chain (DAG-AWTC) ledger system includes a transaction-for-consensus configuration module which is for selecting a transaction for consensus for which a byzantine fault tolerance (EFT) consensus is to be executed with respect to a transaction of a DAG-A WTC, real-time configuring same, and outputting the real-time configured transaction for consensus to a BFT consensus execution module.

2 Claims, 2 Drawing Sheets

(51) Int. Cl.
    *G06F 16/901*     (2019.01)
    *H04L 67/104*     (2022.01)

(56)                References Cited

U.S. PATENT DOCUMENTS

| | | |
|---|---|---|
| 2020/0005255 A1 | 1/2020 | Wu |
| 2020/0143372 A1* | 5/2020 | Liu ....................... H04L 9/3239 |
| 2021/0117410 A1* | 4/2021 | Sekniqi ............... G06F 16/2379 |
| 2021/0391996 A1* | 12/2021 | Chmora ............... H04L 9/3239 |

FOREIGN PATENT DOCUMENTS

| | | |
|---|---|---|
| KR | 10-2019-0070969 A | 6/2019 |
| WO | 2019-072294 A2 | 4/2019 |

OTHER PUBLICATIONS

Locus Chain, Vision White Paper version 02. (korean), May 16, 2018. [Retrieved on: Sep. 28, 2020]. Retrived from: <URL: https://www.locuschain.com/uploads/whitepaper/PAPER_FULL_KO_5_22_2018_19_15_17.pdf>.
Yoo, Seung-Eon et al., "Block Chain Based Consensus Algorithm", Proceedings of The Korea Society of Computer and Information Winter Conference, vol. 26, No. 1, Jan. 2018.

* cited by examiner (a)
Prior Art (b)

[FIG. 3]
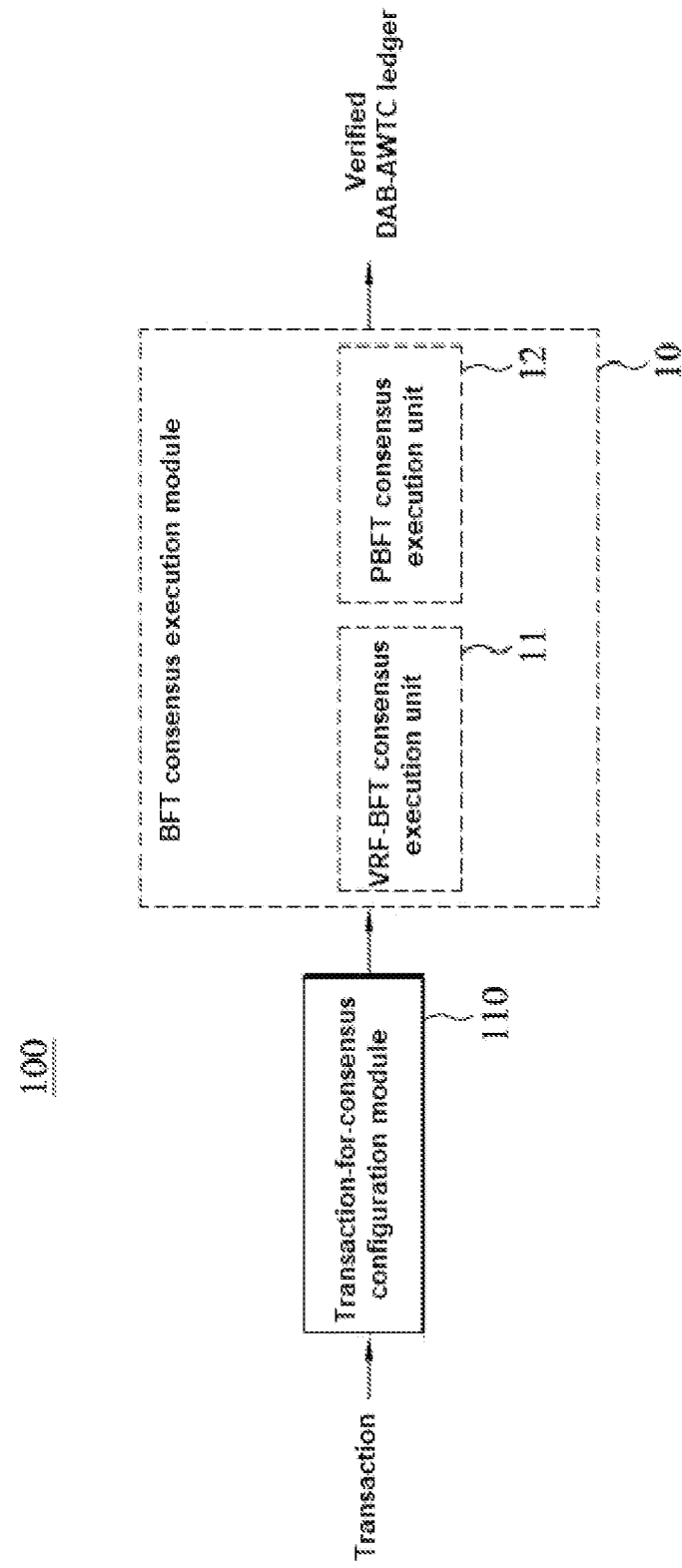

DAG-AWTC LEDGER SYSTEM USING BFT VERIFICATION CONSENSUS MECHANISM

TECHNICAL FIELD

The present invention relates to a directed acyclic graph—account-wise transaction chain with byzantine fault tolerance (DAG-AWTC) ledger system, and particularly, to a DAG-AWTC ledger system using a byzantine fault tolerance (BFT) verification consensus mechanism.

BACKGROUND ART

A distributed ledger is broadly classified into a block chain mechanism and a directed acyclic graph (DAG) mechanism.

FIG. 1 is a conceptual diagram of a block chain and a DAG.

FIG. 1(A) illustrates a generation mechanism of a block chain and FIG. 1(B) illustrates a generation mechanism of a directed acyclic graph (DAG).

As illustrated in FIG. 1(A), a block chain ledger has a ledger structure of a linear chain and is a structure having one writing point, and as a result, the block chain ledger has a disadvantage in that a generation speed of a block is very slow.

On the contrary, the DAG ledger illustrated in FIG. 1(B) has several writing points which are simultaneously present, and is constituted by a chain of a parallel structure. The DAG ledger has an advantage in that a generation speed of a transaction is fast, of course. However, unlike a total ordering mechanism block chain, the DAG ledger is configured by a partial ordering mechanism, and as a result, a writing order may be defined only for interconnected transactions.

That is, the DAG has a fast speed, while has a ledger structure not comparatively suitable for a verification consensus. This is a major reason why various existing DAG ledgers cannot adopt a verification consensus mechanism.

All should have the same state for the verification consensus, and for this, generation of a new transaction is stopped and propagating all current states should be waited. When a process is stopped as such, an advantage of a fast speed acquired by simultaneously generating the transaction at parallel writing points by adopting the DAG is damaged. Therefore, up to now, in the DAG ledger structure, the BFT verification consensus mechanism cannot be adopted.

DISCLOSURE

Technical Problem

An object of the present invention is to provide a DAG-AWTC ledger system using a BFT verification consensus mechanism.

Technical Solution

According to the object of the present invention, a DAG-AWTC ledger system using a BFT consensus mechanism may be configured to include a transaction-for-consensus configuration module which is for selecting a transaction for consensus for which a byzantine fault tolerance (EFT) consensus is to be executed with respect to a transaction of a DAG-A WTC, real-time configuring same, and outputting the real-time configured transaction for consensus to a BFT consensus execution module.

Here, the transaction-for-consensus configuration module may be configured to configure, as the transaction-for-consensus, transactions which are not yet consented before a predetermined past time at the predetermined past time for the transaction which is generated in real time.

Specifically, the transaction-for-consensus configuration module may be configured to configure, a transaction-for-consensus, transactions before any one time before 30 seconds to 1 minute from the now in real time.

In addition, the transaction-for-consensus configuration module may be configured to generate a data structure representing a past state of each account after a propagation, and allow the BFT consensus execution module to perform a BFT consensus by preparing the generated data structure.

Here, in the DAG-AWTC ledger system using the BFT verification consensus mechanism, the merkle patricia trie may be used as a data structure for the consensus, but such a data structure may be replaced with another structure in any degree according to an implementation.

Advantageous Effect

According to the DAG-AWTC ledger system using the BFT verification consensus mechanism, there is an effect that a BFT consensus mechanism which is a verification consensus mechanism in a DAG ledger structure of a parallel structure is configured to be applied to secure rapid validation and an integrity of information together with rapid processing of a transaction.

More specifically, there is an effect that time setting premising that sufficient diffusion is made for BFT verification consensus is given to perform each of the BFT verification consensus and transaction processing in parallel.

That is, the BFT verification consensus is configured to be performed as separate background processing simultaneously with processing the transaction to enable the BFT verification consensus without damaging the fast processing speed of the transaction which the DAG-AWTC ledger structure has.

DESCRIPTION OF DRAWINGS

FIG. 3 is a block diagram of a DAG-AWTC ledger system using a BFT verification consensus mechanism according to an embodiment of the present invention.

BEST MODE

Figure 1:
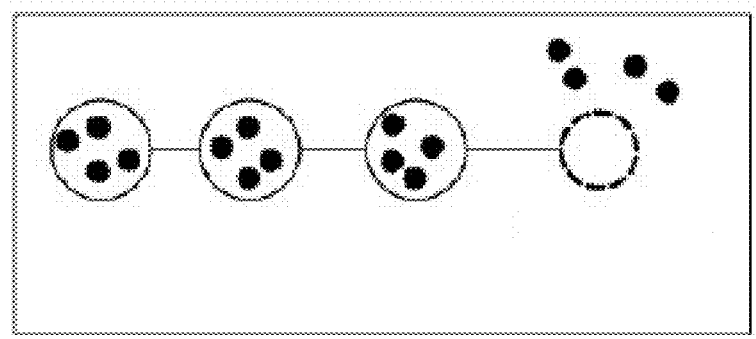
FIG. 1 is a conceptual diagram of a block chain and a DAG.
Figure 1:
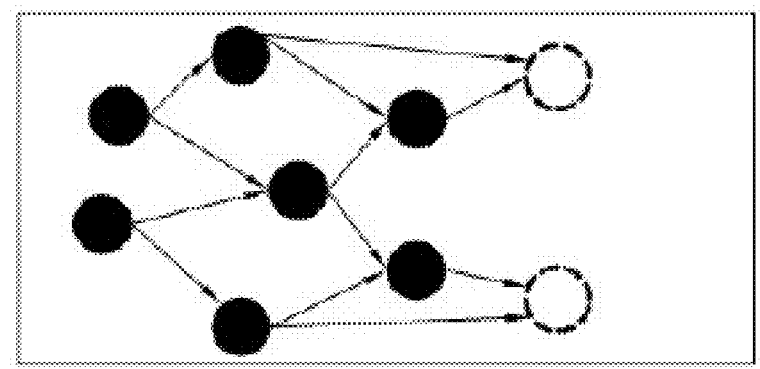

The present invention may have various modifications and various embodiments and specific embodiments will be illustrated in the drawings and described in detail in specific contents for carrying out the present invention. However, this does not limit the present invention to specific embodiments, and it should be understood that the present disclosure covers all the modifications, equivalents and replacements included within the idea and technical scope of the present invention. In describing each drawing, reference numerals refer to like elements.

Terms including as first, second, A, B, and the like are used for describing various constituent elements, but the constituent elements are not limited by the terms. The terms are used only to discriminate one component from another component. For example, a first component may be referred to as a second component, and similarly, the second component may be referred to as the first component without departing from the scope of the present invention. A term 'and/or' includes a combination of a plurality of associated disclosed items or any item of the plurality of associated disclosed items.

It should be understood that, when it is described that a component is "connected to" or "accesses" another component, the component may be directly connected to or access the other component or a third component may be present therebetween. In contrast, when it is described that a component is "directly connected to" or "directly accesses" another component, it is understood that no element is present between the element and another element.

Terms used in the present application are used only to describe specific embodiments, and are not intended to limit the present disclosure. A singular form includes a plural form if there is no clearly opposite meaning in the context. In the present application, it should be understood that the term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

If not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Hereinafter, a preferred embodiment of the present invention will be described in detail with reference to the accompanying drawings.

Figure 2:
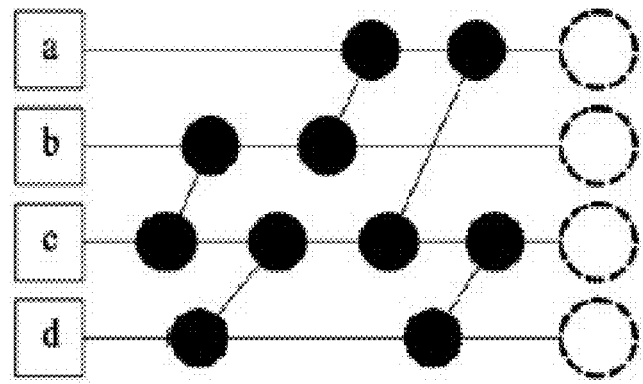
FIG. 2 is a conceptual diagram of a DAG-AWTC.

FIG. 2 is a conceptual diagram of a DAG-AWTC.

FIG. 2 illustrates a DAG ledger structure mechanism in which a transaction chain is formed for each account.

That is, accounts a, b, c, and d have chains, respectively, and transactions among respective accounts are written in parallel. A DAG-AWTC ledger is a mechanism that since the writing of the transaction is made in parallel, a writing speed is very fast, and there is a not particular limit in speed or scalability.

According to the present invention, a Byzantine fault tolerance (BFT) algorithm which is a verification consensus algorithm is applied to the DAG-AWTC ledger.

FIG. 3 is a block diagram of a DAG-AWTC ledger system using a BFT verification consensus mechanism according to an embodiment of the present invention.

Referring to FIG. 3, a DAG-AWTC ledger system 100 using a BFT verification consensus mechanism according to an embodiment of the present invention may be configured to include a transaction-for-consensus configuration module 110.

In the DAG-AWTC ledger system 100 using a BFT verification consensus mechanism, the BFT verification consensus algorithm is applied to the DAG-AWTC ledger structure.

The DAG-AWTC ledger system 100 has an advantage of a high transaction processing speed and unlimited scalability of a DAG ledger which is a parallel ledger structure, and an account-wise transaction chain (AWTC) mechanism is merged to generate the transaction rapidly without a decrease in speed even though the number of accounts increases. Unlike a block chain, the transaction may be immediately generated without waiting for block generation.

In the case of the block chain ledger, since the transaction is collected and the block is generated at one writing point by a total ordering mechanism, a long time required, but a generation order is definite.

However, in the case of the DAG ledger, since the transaction is written at several writing points by a partial ordering mechanism, a short time is required. However, there is a disadvantage in that the writing order may be defined between only connected transactions. Most of all, since a propagation time is different upon the consensus for each node, it is difficult to merge the verification consensus mechanism.

However, the DAC-AWTC ledger system 100 using the BFT verification consensus mechanism is configured to apply Byzantine fault tolerance (BFT) which is the verification consensus mechanism.

When the verification consensus mechanism is verified once according to a predetermined procedure, the verification consensus mechanism is not changed.

However, in a non-verification consensus mechanism, it is regarded that a state selected by a majority is consented at a current time. However, if the state selected by the majority is changed over time, the consented state is also changed. That is, there is a consensus which is not changed. For example, the non-verification consensus mechanism is applied to bitcoin or ethereum.

In the DAG-AWTC ledger system 100 using the BFT verification consensus mechanism, respective nodes generate the DAG ledger by the consensus for transactions written in respective nodes. The verification consensus mechanism is not changed after the consensus is made.

The DAG-AWTC ledger system 100 using the BFT verification consensus mechanism is configured to make the consensus in a premise that when any degree of transaction propagation time elapsed in the consensus procedure in each node, the diffusion is almost made.

That is, when the diffusion is sufficiently made, it may be regarded that it is ready to consent. For example, since there is a high probability that the respective nodes will have the same information while the diffusion is made at approximately 90%, a probability that the consensus will be made becomes higher.

In the DAG-AWTC ledger system 100 using the BFT verification consensus mechanism, the BFT verification consensus is performed by regarding that the diffusion is sufficient by an elapse of a propagation of approximately seconds to 1 minute in applying the BFT verification consensus mechanism.

In the case of applying the BFT verification consensus without such a premise, since the nodes have very different current states before the elapse of the propagation time of approximately 30 seconds to 1 minute, i.e., before the diffusion is sufficient, the consensus itself may not be normally made.

In the present invention, there is a point that the BFT verification consensus is enabled in the DAG-AWTC ledger structure by setting a time interval for a time of assuming that the diffusion is sufficient. This will be described below in more detail.

First, since the DAG-AWTC ledger structure is a structure in which a collision does not basically occur because an owner of an account generates a transaction related thereto, and the DAG-AWTC ledger structure is a structure in which a collision occurrence possibility is low because a write location of the transaction is different for each account by a chain structure for each account. Therefore, a configuration which sets the time interval enables the BFT verification consensus to be performed in the background without preventing the processing of the transaction.

That is, even while the BFT verification consensus is in progress, a situation to block the transaction processing in the DAG-AWTC structure does not almost occur, and the BFT verification consensus and the transaction processing may be simultaneously performed in parallel.

Hereinafter, a detailed configuration will be described.

The transaction-for-consensus configuration module 110 may be configured to select a transaction for which the BFT consensus is to be performed for transactions, and configure the transaction as a transaction-for-consensus in real time.

The transaction-for-consensus configuration module 110 may be configured to configure, as the transaction-for-consensus, transactions which are not yet consented before a predetermined past time at the predetermined past time for the transaction which is generated in real time.

When the time of approximately 30 seconds to 1 minute is consumed as a result of a simulation, it is confirmed that the sufficient diffusion is made for the consensus.

When the consensus procedure is performed after such a degree of diffusion time elapsed, the consensus procedure is rapidly performed within an optimal time to verify the DAG-AWTC ledger.

Meanwhile, such a time interval may be somewhat fluid. Such a time interval is not limited to the time of approximately 30 seconds to 1 minute, and may be a time when it may be regarded that the sufficient diffusion is made for the consensus.

However, in order to prepare for merkle patricia trie of each account, a size thereof itself becomes a few hundreds of MBs, and as a result, a significant load is given.

Therefore, the transaction-for-transaction configuration module 110 may be configured to generate a past tree of each account after the propagation, i.e., a past common state as a root of merkle patricia trie of approximately several bytes. In addition, the transaction-for-transaction configuration module 110 may be configured to allow the BFT consensus execution module 10 to perform the consensus for preparation between roots of merkle patricia trie. That is, the consensus procedure becomes convenient by preparing only for a merkle root in an abbreviation state, and the resulting consensus time is also reduced.

Here, in the DAG-AWTC ledger system 100 using the BFT verification consensus mechanism, the merkle patricia trie is used as a data structure for the consensus, but such a data structure may be replaced with another structure in any degree according to an implementation.

Transactions-for-consensus configured in real time in the transaction-for-consensus configuration module 110 are configured to perform a BFT consensus execution procedure in the BFT consensus execution module 10.

The BFT consensus execution module 10 may execute a verifiable random function (VRF)-BFT or practical byzantine tolerance (PBFT) according to an embodiment.

The present invention has been described with reference to the exemplary embodiments. However, it will be appreciated by those skilled in the art that various modifications and changes of the present invention can be made without departing from the spirit and the scope of the present invention which are defined in the appended claims and their equivalents.

The invention claimed is:

1. A DAG (directed acyclic graph)-AWTC (account-wise transaction chain) ledger system using a BFT (byzantine fault tolerance) consensus mechanism, comprising:
   an AWTC ledger comprising a plurality of independent section chains, wherein each independent transaction chain is allocated to a designated account and includes transactions generated only by an owner of the designated account; and
   a transaction-for-consensus configuration module, implemented by at least one processor and a memory, configured to:
      select transactions eligible for consensus in real time from the account-wise transaction chains within the AWTC ledger, wherein:
         the selected transactions are defined as not yet having been included in a consented consensus, simultaneously the selected transactions that were generated prior to a deterministic time point, wherein the deterministic time point is a fixed duration in the past relative to the current real-time moment,
      generate a data structure representing a state of a DAG-AWTC ledger at a time point, wherein the time point corresponds to a period sufficient for transaction propagation across a communication network; and
      output the generated data structure in real-time to a BFT consensus execution module which is implemented by at least one processor and the memory, to perform the consensus process based on the generated data structure.

2. The DAG-AWTC ledger system using a BFT consensus mechanism of claim 1, wherein the transaction-for-consensus configuration module is further configured to upon selecting transactions generated prior to the deterministic time point, set the deterministic time point as either 30 seconds or 1 minute before the current real-time moment.

* * * * *